UNITED STATES PATENT OFFICE 2,686,730

ENZYME COMPOSITIONS FOR USE IN COATING COMPOSITION CONTAINING STARCH

Sutton Redfern and James F. Lenney, Bronx, N. Y., assignors to Standard Brands Incorporated, New York, N. Y., a corporation of Delaware No Drawing. Application May 14, 1949,
Serial No. 93,426

10 Claims. (Cl. 106—214)

This invention relates to fillers for dry concentrates of the starch-liquefying enzymes known as alpha amylases.

The alpha amylases are commonly used in the paper industry for the preparation of sizings, coating compositions, and laminating adhesives from starch. These enzymes are obtained from various sources in the form of aqueous solutions. While we may use alpha amylases containing some beta amylase, we prefer a starch-liquefying enzyme produced by bacterial fermentation having a high alpha amylase content and substantially free from beta amylase such as that described, for instance, in Patent No. 2,159,678 to Schultz, Atkin and Frey. The enzyme is isolated in a dry state and is then mixed with a suitable filler which is desirable for the purpose of reducing and standardizing the strength of the enzyme. When the enzyme composition is used for making plain starch sizing and laminating adhesives, the selection of a suitable filler is not too critical.

The requirements of the filler are quite stringent, however, when the enzyme composition containing the same is used to prepare coating compositions by conversion of starch in the presence of clay as described, for instance, in Patents Nos. 2,360,828, 2,388,526, and 2,394,233 to William L. Craig. In such case, the diluent must fulfill the following three requirements:

1. It must be cheap;
2. It must be compatible with the clay, that is, it must not precipitate the clay; and,
3. It must not absorb or otherwise inactivate the enzyme appreciably.

Cornstarch is a commonly used filler which fulfills the second and third requirements, but is relatively expensive. Such common fillers as clays, diatomaceous earths, wood flour, walnut shell flour, and precipitated silica cannot be used with the alpha amylases, because they all adsorb the enzyme and render it inactive.

We have found that white floated barytes and the hydrated aluminas, for instance, $Al_2O_3 \cdot 3H_2O$, are satisfactory fillers for these enzyme compositions in that they do not adsorb the enzyme appreciably or flocculate clay coating compositions and are cheaper than cornstarch. These materials must be regarded as unique because so many other finely divided materials adsorb the enzyme. Even C. P. barium sulfate adsorbs an appreciable quantity of the enzyme and, therefore, is not satisfactory.

To prepare the composition according to the invention, the filler is added in finely divided condition to the dry enzyme preparation and is mixed thoroughly therewith. The fillers may be added in varying amounts to obtain any desired dilution of the composition. They may be used alone or in admixture with each other in any proportions. They may also be used with cornstarch and with small amounts of sodium chloride or sodium sulfate, that is, amounts which will not flocculate a clay coating composition.

The invention is illustrated by the following examples in which the enzyme used was a dry alpha amylase concentrate of bacterial origin having a liquefon (Analytical Edition, Journal of Industrial and Engineering Chemistry, volume 7, pages 143–6, May 15, 1935) content of 30,000 per gram.

Example 1

| | Grams |
|---|---|
| Enzyme | 2.15 |
| Fine powdered sodium chloride | 10.00 |
| White floated barytes | 87.85 |

Example 2

| | Grams |
|---|---|
| Enzyme | 2.15 |
| Fine powdered sodium chloride | 15.00 |
| Hydrated alumina | 82.85 |

It is to be understood that the foregoing examples are given for purposes of illustration only and that the invention is not to be limited except as indicated in the appended claims.

We claim:

1. A dry composition comprising an alpha amylase and a filler, the filler being composed largely of a compound of the group consisting of white floated barytes and hydrated alumina.

2. A dry composition comprising bacterial alpha amylase and a filler composed largely of white floated barytes and hydrated alumina.

3. A dry composition comprising bacterial alpha amylase and a filler composed largely of white floated barytes.

4. A dry composition comprising bacterial alpha amylase and a filler composed largely of hydrated alumina.

5. In a process for preparing coating compositions involving the conversion of starch in an aqueous clay suspension by means of alpha amylase, the step which comprises adding the alpha amylase in admixture with white floated barytes as a filler.

6. In a process for preparing coating compositions involving the conversion of starch in an aqueous clay suspension by means of alpha amylase, the step which comprises adding the alpha amylase in admixture with hydrated alumina as a filler.

7. A process as claimed in claim 5 wherein the alpha-amylase is of bacterial origin.

8. A process as claimed in claim 6 wherein the alpha-amylase is of bacterial origin.

9. A dry composition comprising bacterial alpha amylase and a filler, the filler being composed of a small amount of sodium chloride and the remainder a compound of the group consisting of white floated barytes and hydrated alumina.

10. A dry composition comprising bacterial alpha amylase and a filler, the filler being composed of a small amount of sodium sulfate and the remainder a compound of the group consisting of white floated barytes and hydrated alumina.

References Cited in the file of this patent

UNITED STATES PATENTS

| Number | Name | Date |
|---|---|---|
| 722,807 | Burckett | Mar. 17, 1903 |
| 1,100,176 | Elger | June 16, 1914 |
| 1,404,137 | Neun | Jan. 17, 1922 |
| 1,943,467 | Bley | Jan. 16, 1934 |

OTHER REFERENCES

Kitano. Chemical Abstracts, vol. 30; 6017. Citing J. Soc. Chem. Ind. Japan 39, Supp. Binding 163–4 (1936).